(12) United States Patent
Qu et al.

(10) Patent No.: US 10,731,523 B2
(45) Date of Patent: Aug. 4, 2020

(54) VALVE SEAT INSERT FOR INTERNAL COMBUSTION ENGINE PROFILED TO RESIST VALVE RECESSION

(71) Applicant: Caterpillar Inc., Deerfield, IL (US)

(72) Inventors: Rong Qu, Dunlap, IL (US); Ashwin Hattiangadi, Edwards, IL (US); Sanjay Kumar, Dunlap, IL (US); Kevin D. Yoder, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/188,547

(22) Filed: Nov. 13, 2018

(65) Prior Publication Data

US 2020/0149440 A1   May 14, 2020

(51) Int. Cl.
| | | |
|---|---|---|
| *F01L 3/04* | (2006.01) | |
| *F01L 3/22* | (2006.01) | |
| *F02M 21/02* | (2006.01) | |
| *F16K 1/42* | (2006.01) | |
| *F16K 25/04* | (2006.01) | |
| *F16K 25/00* | (2006.01) | |

(52) U.S. Cl.
CPC .............. *F01L 3/04* (2013.01); *F01L 3/22* (2013.01); *F02M 21/023* (2013.01); *F02M 21/026* (2013.01); *F16K 1/42* (2013.01); *F16K 25/005* (2013.01); *F16K 25/04* (2013.01)

(58) Field of Classification Search
CPC ....... F01L 3/20; F01L 3/22; F01L 3/06; F01L 3/02
See application file for complete search history.

(56) References Cited

U.S. PATENT DOCUMENTS

| | | | |
|---|---|---|---|
| 4,831,976 A | 5/1989 | Pozniak et al. | |
| 4,999,911 A | 3/1991 | Anderson | |
| 5,745,993 A | 5/1998 | Adachi et al. | |
| 6,260,531 B1 * | 7/2001 | Haan | F01L 3/02 |
| | | | 123/188.8 |
| 6,536,397 B2 * | 3/2003 | Mizutani | B23K 20/129 |
| | | | 123/188.8 |

(Continued)

FOREIGN PATENT DOCUMENTS

| | | |
|---|---|---|
| JP | 8270417 A | 10/1996 |
| JP | 2013119837 A | 6/2013 |

(Continued)

OTHER PUBLICATIONS

WIPO Office, International Search Report for PCT/US2019/059740. Authorized Officer Vangeli Tzikas, Not yet published, Publisher will be WIPO Office, Entire Document.

*Primary Examiner* — Long T Tran
(74) *Attorney, Agent, or Firm* — Brannon Sowers & Cracraft

(57) ABSTRACT

An internal combustion engine includes a valve seat insert within an engine housing, and a gas exchange valve. The valve seat insert has a compound valve seat with a valve recession-resistive profile formed by a leading radius contacted by the valve seat at an early wear state of the valve head and valve seat insert, a trailing radius contacted by the valve head at a later wear state of the valve head and valve seat insert, and an outer seat face. The compound valve seat is shaped and proportioned to cushion contact by a gas exchange valve and retard valve recession.

20 Claims, 3 Drawing Sheets

(56) References Cited

U.S. PATENT DOCUMENTS

| | | | | |
|---|---|---|---|---|
| 9,228,458 B2* | 1/2016 | Reinhart | ................... | F01L 3/04 |
| 2008/0072948 A1* | 3/2008 | McGilvray | ............. | F02B 63/04 |
| | | | | 136/230 |
| 2014/0190441 A1 | 7/2014 | Chern et al. | | |

FOREIGN PATENT DOCUMENTS

| | | |
|---|---|---|
| KR | 2013083608 A | 7/2013 |
| WO | 2013093541 A1 | 6/2013 |
| WO | 2017090330 A1 | 6/2017 |

\* cited by examiner

VALVE SEAT INSERT FOR INTERNAL COMBUSTION ENGINE PROFILED TO RESIST VALVE RECESSION

TECHNICAL FIELD

The present disclosure relates generally to engine valves and associated hardware, and more particularly to an engine valve seat insert profiled to resist valve recession.

BACKGROUND

Gas exchange valves are used in internal combustion engines to control fluid connections between the cylinder and a supply of intake air or intake air and other gases such as recirculated exhaust gas, or between the cylinder and an exhaust manifold for expelling combustion products during operation. Designs are known wherein a single intake valve and a single exhaust valve are associated with each cylinder in an engine, as well as designs where multiple gas exchange valves of each respective type are associated with each cylinder. A camshaft, typically rotated at half engine speed, is coupled with valve lifters, bridges, rocker arms, and/or other equipment for controlling the opening and closing of gas exchange valves at appropriate engine timings.

Gas exchange valves are moved out of contact with and into contact with the engine head or a valve seat insert within the engine head to effect their opening and closing actions. Gas exchange valves may be moved between their open and closed positions with significant mechanical forces, and are exposed to combustion temperatures of several hundred degrees along with relatively high in-cylinder pressures. These and other factors contribute to the gas exchange valve environment being quite harsh. It has been observed that gas exchange valves and valve seats or valve seat inserts can exhibit a phenomenon over time known as valve recession. Over the course of an engine's service life, or between service intervals, the contacts between a gas exchange valve and its valve seat can number in the millions or potentially even billions. The harsh conditions and great number of impacts can cause material of which the gas exchange valve and/or the valve seat is formed to wear away and/or become deformed, so that the valve "recedes" toward or into the engine head further than what is desired. Where valve seat recession becomes severe enough engine operation or performance can be compromised, sometimes requiring a so-called top end overhaul prematurely. Engineers have experimented with a variety of different techniques attempting to ameliorate the extent and effects of valve seat recession and other valve wear patterns. One strategy apparently aimed at preventing the outer diameter side of a valve face from locally wearing is set forth in Japanese Patent Application Publication No. JP8270417A. According to the '417 reference, a convex surface bulging toward a seat surface of a valve face abuts against the seat surface of a valve seat to address local wear problems.

SUMMARY OF THE INVENTION

In one aspect, an internal combustion engine includes an engine housing having a cylinder block with a cylinder formed therein, and an engine head coupled to the cylinder block and having a gas exchange conduit formed therein. The internal combustion engine further includes a valve seat insert positioned at least partially within the engine head and having a compound valve seat extending circumferentially around a valve seat center axis. The internal combustion engine still further includes a gas exchange valve having a valve head with an outer valve face and an inner valve face, the gas exchange valve being movable between a closed valve position where the inner valve face contacts the compound valve seat and the cylinder is blocked from fluid communication with the gas exchange conduit, and an open valve position. The compound valve seat has a valve recession-resistive profile formed by a leading radius contacted by the valve head at an early wear state of the valve head and valve seat insert, a trailing radius contacted by the valve seat at a later wear state of the valve head and valve seat insert, and an outer seat face. The inner valve face defines a valve angle relative to a plane oriented normal to the valve seat center axis, and the outer seat face extending from the leading radius to the trailing radius and defining a seat angle relative to the plane. The inner valve face overhangs the outer seat face and the seat angle is larger than the valve angle, such that the leading radius forms a contact band with the inner valve face at the closed position and a starting face clearance extends radially inward and axially inward from the contact band.

In another aspect, a valve seat insert for a gas exchange valve in an internal combustion engine includes an insert body positionable within an engine head and including an outer surface, and an inner surface forming an opening within the insert body to fluidly connect a cylinder in the internal combustion engine to a gas exchange conduit in the engine head. A compound valve seat is formed in the insert body and in communication with the opening, the compound valve seat extending circumferentially around a valve seat center axis that extends between a leading axial body end and a trailing axial body end. The inner surface has a non-uniform inner profile that flares outward between the opening and the trailing axial body end, the outer surface has a non-uniform outer profile that dips inward between the leading axial body end and the trailing axial body end, and the compound valve seat having a valve recession-resistive profile. The valve recession-resistive profile is formed by a leading radius, an outer seat face, and a trailing radius structured, respectively, for contact with a valve head of a gas exchange valve at a contact band that advances radially inward and axially inward at successive wear stages of the valve seat insert and valve head. The outer seat face extends from the leading radius to the trailing radius and defines a seat angle relative to a plane oriented normal to the valve seat center axis that is between 19° and 20°, and has a full face width between the leading radius and the trailing radius that is between 3 millimeters and 4 millimeters.

In still another aspect, an engine head assembly includes an engine head having a gas exchange conduit formed therein, and a valve seat insert positioned at least partially within the engine head to fluidly connect the gas exchange conduit to an engine cylinder. The valve seat insert has formed therein a compound valve seat extending circumferentially around a valve seat center axis and having a valve recession-resistive profile formed by a leading radius, an outer seat face, and a trailing radius structured, respectively, for contact with a valve head of a gas exchange valve at a contact band that advances radially inward and axially inward at successive wear stages of the valve seat insert and valve head. The outer seat face extends from the leading radius to the trailing radius and defines a seat angle relative to a plane oriented normal to the valve seat center axis that is between 19° and 20° and has a full face width between the leading radius and the trailing radius that is between 3 millimeters and 4 millimeters.

DETAILED DESCRIPTION

Figure 1:
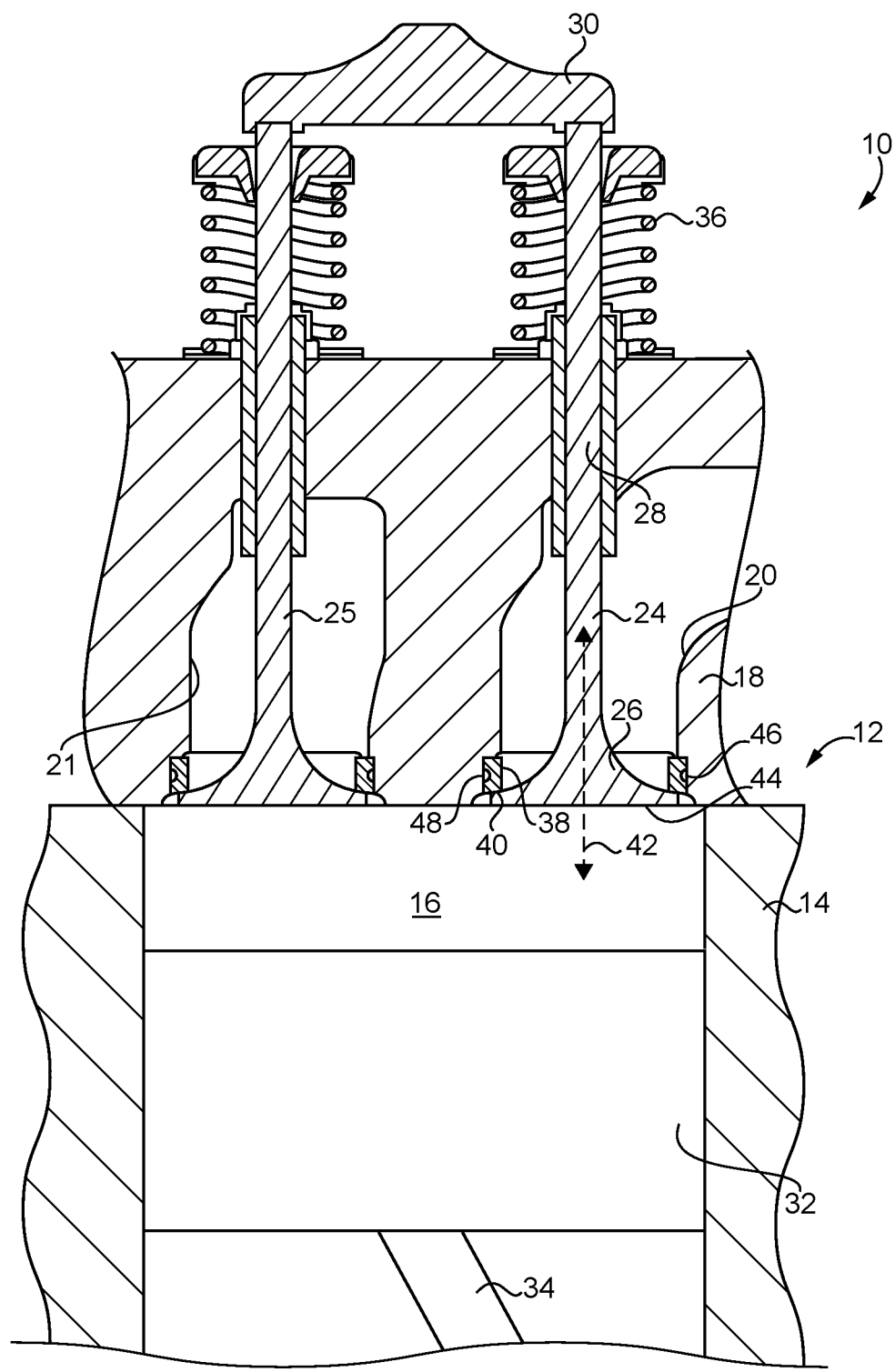
FIG. 1 is a sectioned side diagrammatic view of an internal combustion engine, according to one embodiment.

Referring to FIG. 1, there is shown an internal combustion engine according to one embodiment and including an engine housing 12 having a cylinder block 14 with a cylinder 16 formed therein. Internal combustion engine 10 (hereinafter "engine 10") could be any of a variety of engines including a compression ignition diesel engine, a spark-ignited gasoline engine, and in one practical implementation strategy, a gaseous fuel spark-ignited engine structured to operate on a fuel that is gaseous at standard temperature and pressure. Suitable fuels could include natural gas, methane, landfill gas, biogas, mixtures of these, or still others. An engine head 18 is coupled to cylinder block 14 and has a first gas exchange conduit 20 and a second gas exchange conduit 21 formed therein. Gas exchange conduits 20 and 21 could each or either be an intake conduit structured to fluidly connect with an intake manifold or an exhaust conduit structured to connect with an exhaust manifold. Gas exchange conduits 20 and 21 could thus each include intake conduits, each include exhaust conduits, or could be one of each.

A piston 32 is movable within cylinder 16 between a bottom-dead center position and a top-dead center position and is coupled to a crankshaft (not shown) by way of a connecting rod 34 in a generally conventional manner. Engine 10 could include any number of cylinders arranged in any suitable configuration such as a V-configuration, an in-line configuration, or still another. Engine head 18 could include a monolithic engine head associated with all of a plurality of individual cylinders in engine 10, or could be one of a plurality of separate engine head sections each associated with less than all of the cylinders in engine 10. Engine 10 further includes a gas exchange valve 24, and in the illustrated embodiment showing a second gas exchange valve 25, including a valve head 26 having an outer valve face or combustion face 44 and an inner valve face or sealing face 46. Gas exchange valve 24 is discussed herein in the singular, however, it will be understood that the description of gas exchange valve 24 can apply by way of analogy to gas exchange valve 25 and any other gas exchange valves within engine 10. Gas exchange valves 24 and 25 are shown more or less vertically oriented with respect to a direction of reciprocation of piston 32, however, it should also be appreciated that other configurations such as gas exchange valves at diagonal orientations are contemplated herein. Gas exchange valve 24 further includes a shaft 28 connected to valve head 26 and coupled by way of a valve bridge 30 to the other gas exchange valve 25 such that gas exchange valves 24 and 25 can move together between open and closed positions, such as in response to rotation of a camshaft and movement of a rocker arm, a valve lifter assembly, and/or other equipment. A return spring 36 is coupled with gas exchange valve 24 in a generally conventional manner. Engine 10 further includes a valve seat insert 38 positioned at least partially within engine head 18 and having a compound valve seat 40 extending circumferentially around a valve seat center axis 42. Gas exchange valve 24 is movable between a closed valve position where inner valve face 46 contacts compound valve seat 40 and cylinder 16 is blocked from fluid communication with gas exchange conduit 20, and an open valve position. As will be further apparent from the following description valve seat insert 38 is structured, together with gas exchange valve 24, to retard valve recession over the course of a service life or service interval of engine 10.

Figure 4:
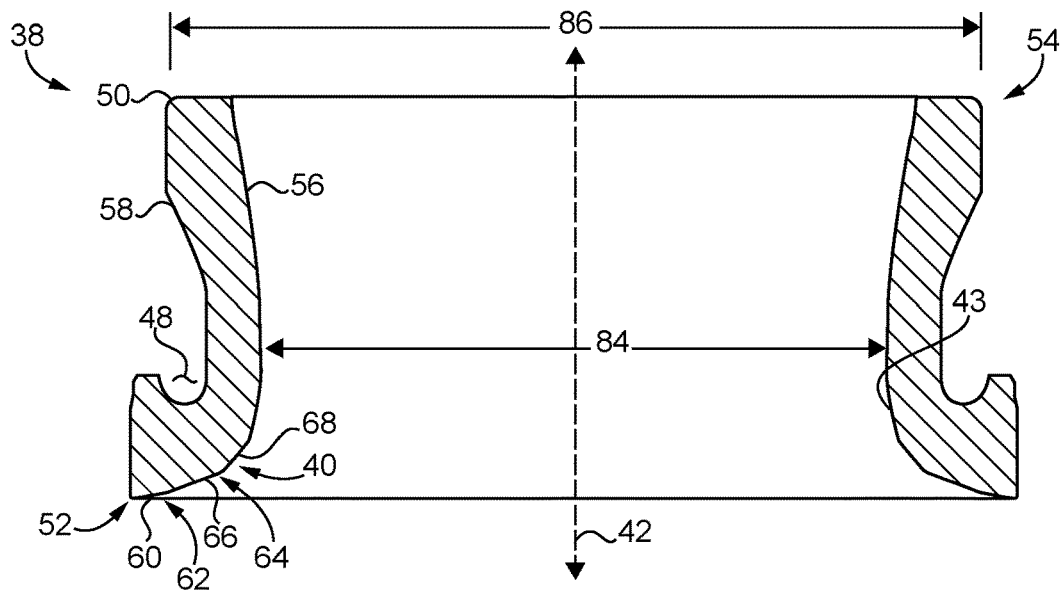
FIG. 4 is a sectioned side diagrammatic view of a valve seat insert, according to one embodiment.
Figure 5:
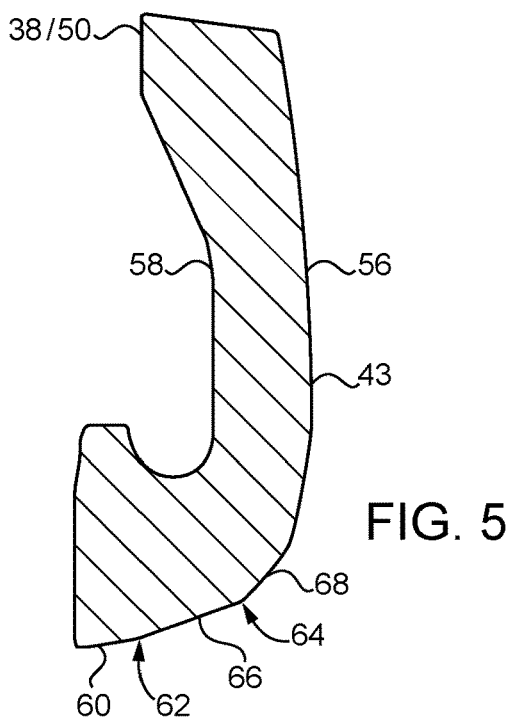
FIG. 5 is an enlarged view of a portion of the valve seat insert of FIG. 4.
Figure 6:
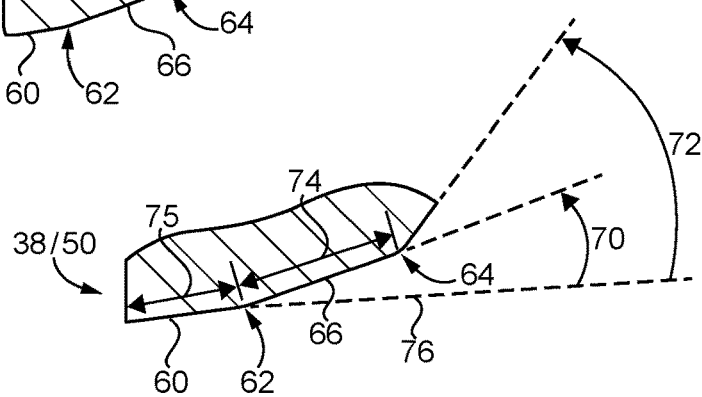
FIG. 6 is another enlarged view of a portion of the valve seat insert of FIG. 4.

To this end, and now with further reference to FIGS. 4, 5, and 6 valve seat insert 38 may be formed by a generally annular one-piece metallic insert body 50 that is retained within engine head 18 by way of an interference fit. At top end overhaul engine head 18 can be disassembled from cylinder block 14 and a plurality of valve seat inserts substantially identical to valve seat insert 38 can be disassembled from engine head 18 as necessary for replacement. As discussed above, it has been observed that upon top end overhaul gas exchange valve seats and associated gas exchange valves may have experienced an undesired extent of valve recession, meaning that upon reaching a closed position, deformation and/or wearing away of material can result in the gas exchange valve traveling into the respective valve seat insert further than desired when closed. The excessive valve recession potentially leads to reduced gas exchange valve and overall engine performance. Compound valve seat 40 has a valve recession-resistive profile structured to retard valve seat recession that might otherwise be observed, and typically such that greater reliability and uniformity among a plurality of different valve seat inserts in an engine can be expected. In some instances, with existing designs excessive valve seat recession in a single one of a plurality of valve seat inserts can necessitate an earlier top end overhaul than what might otherwise be desired. The valve recession-resistive profile can be understood as the profile, such as that illustrated in FIGS. 4-6, of compound valve seat 40 in a section plane that includes valve seat center axis 42. Valve seat 40 is understood as compound in that it includes multiple structurally distinct but functionally interrelated parts, in contrast to valve seats having a single seating surface that is contacted by a valve body. It can further be noted that valve seat center axis 42 extends between a leading axial end 52, which will be oriented toward and exposed to cylinder 16 in service, and a trailing axial end 54 of insert body 50. Insert body 50 further includes an inner surface 56, and an outer surface 58. An opening 43 is formed in and through insert body 50 to fluidly connect cylinder 16 in engine 10 to gas exchange conduit 20 within engine head 18. Opening 43 can be understood as formed by a narrowest inner diameter dimension 84 defined by inner surface 56. Inner surface 56 has a non-uniform inner profile that flares outward between opening 43 and trailing axial body end 54, in other words opening axially outward. Outer surface 58 has a non-uniform outer profile that dips inward between leading axial body end 52 and trailing axial body end 54.

The valve recession-resistive profile is formed by a leading radius 62 contacted by valve head 26 as further described herein at an early wear state or stage of valve head 26 and valve seat insert 38, a trailing radius contacted by valve head 26 at a later wear state or stage of valve head 26 and valve seat insert 38, and an outer seat face 66. The terms "early" and "later" are used herein in a relative sense in relation to each other. Thus, "early" does not necessarily mean initial or new, and "later" does not necessarily mean used or old, however, in some instances such descriptions could be accurate. In an implementation, outer seat face 66 extends linearly between leading radius 62 and trailing radius 64, forming a straight line segment of the valve recession-resistive profile in the illustrated section plane. Each of leading radius 62 and trailing radius 64 form curved segments of the profile and are blended with outer seat face 66. As used herein the term "blended" should be understood to mean that an endpoint of one linear or curvilinear segment is the endpoint of an adjoining linear or curvilinear segment. The subject radiuses are physical structures, not dimensions, of compound valve seat 40. Valve seat insert 38 and thus insert body 50 further includes a chamfer 68 located adjacent to trailing radius 64, and an end face 60 located adjacent to leading radius 62. Trailing radius 64 is blended with chamfer 68, and leading radius 62 is blended with end face 60. In an implementation, a size of leading radius 62 is larger than a size of trailing radius 64, and a size of outer seat face 66 is greater than a size of leading radius 62 and a size of trailing radius 64. The sizes disclosed herein for the subject radiuses refer to the magnitude of the radius of a circle that is defined by the curved physical structures that are leading radius 62 and trailing radius 64. The size of outer seat face 66 may further be greater than a size of chamfer 68 and greater than a size of end face 60. The subject size of outer seat face 66 and the size of chamfer 68 can each include a full face width, in the subject and illustrated section plane, as further discussed herein.

In an implementation, the size of leading radius 62 may be about 2 millimeters, and the size of trailing radius 64 may be about 1 millimeter. As used herein, the term "about" can be understood in the context of conventional rounding to a consistent number of significant digits. Accordingly, "about 2" means from 1.5 to 2.4, "about 2.0" means from 1.95 to 2.04, and so on. Where the term "about" is not used in association with a quantity or a range then that quantity or range which is expressed is intended to be exact within manufacturing tolerances. A size of trailing radius 64 may be about 1 millimeter. A size of chamfer 68 may be about 2.2 millimeters. Outer seat face 66 is further understood to define a seat angle 70 relative to a plane 76 shown in FIG. 6 that is oriented normal to valve seat center axis 42. Seat angle 70 is less than 20°, and typically between 19° and 20°. Outer seat face 66 has a full face width between leading radius 62 and trailing radius 64 that is greater than 3 millimeters, and typically between 3 millimeters and 4 millimeters. In an implementation, seat angle 70 is about 19.6°, and full face width 74 of outer seat face 66 is about 3.6 millimeters. It can also be noted from FIG. 4 that a coolant void 48 shown formed at least in part by outer surface 58 is also shown in FIG. 1. Inner diameter dimension 84 at opening 43 may be about 42 millimeters. An outer diameter dimension 86 at trailing axial end 50 may be about 55 millimeters. Insert body 50 may be wider in radial directions than it is long in axial directions.

Figure 2:
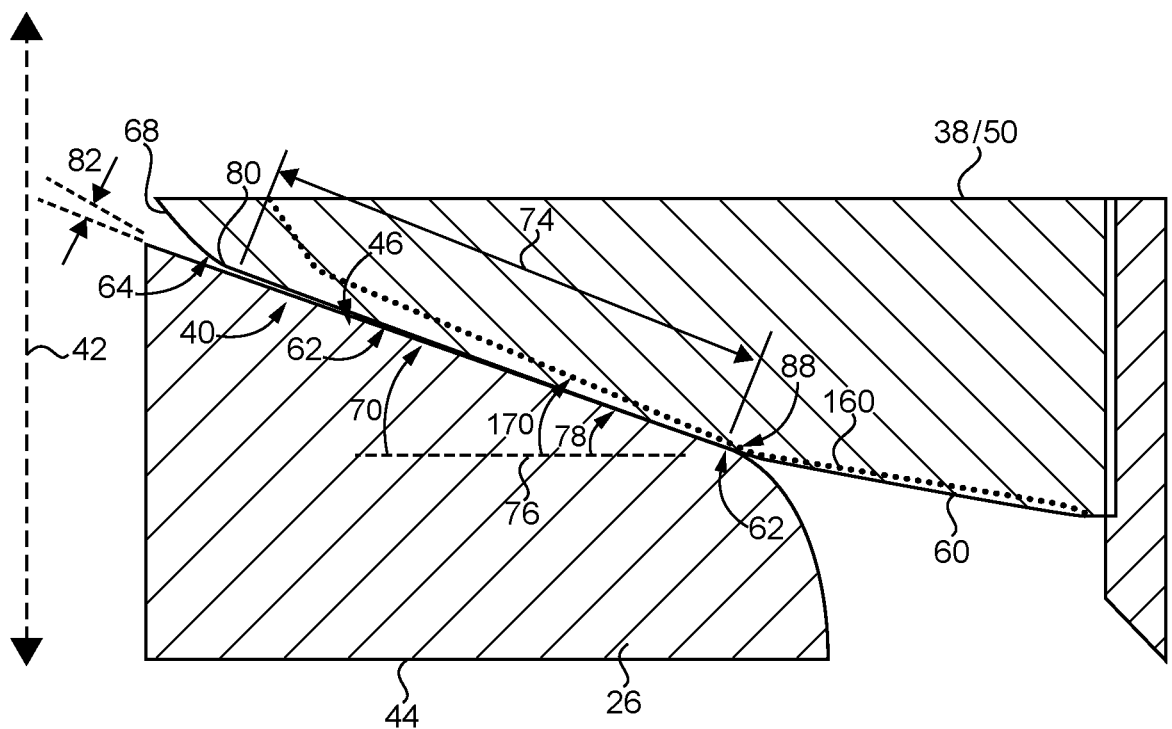
FIG. 2 is a sectioned side diagrammatic view of portions of a gas exchange valve and a valve seat insert as they might appear when first placed in service in an internal combustion engine.

Referring also now to FIG. 2, there is shown valve seat insert 38 as it might appear at an early wear state or stage of valve head 26 and valve seat insert 38. Certain of the angles and dimensions discussed in connection with FIGS. 4-6 are also shown in FIG. 2. In addition, it can be seen that inner valve face 46 overhangs outer seat face 66, meaning that outer seat face 66 extends radially outward and axially outward past a point at which outer seat face 66 transitions with leading radius 88. As used herein, the term "axially outward" can be understood to mean away from a midpoint of a line segment of valve seat center axis 42 corresponding to a full axial length of insert body 50, with "axially inward" meant to refer to an opposite direction toward that midpoint. Inner valve face 46 defines a valve angle 78 relative to plane 76. Seat angle 70 is larger than valve angle 78, such that leading radius 62 forms a contact band 88 with inner valve face 46 at the closed position approximately as shown in FIG. 2 and a starting face clearance 80 extends radially inward and axially inward from contact band 88. Contact band 88 will be annular, and when the components are first placed in service can be or be close to a line contact pattern. It will thus be understood that outer seat face 66 and inner valve face 46 may be very close to one another, but nominally not touching except where leading radius 62 contacts overhanging inner valve face 46 when the components are first placed in service. From the early wear state or stage configuration shown in FIG. 2, deformation and wear of the components can occur such that the pattern of contact changes and contact band 88 advances and enlarges radially inward and axially inward at successive wear stages or states of valve seat insert 38 and valve head 26.

As noted above, seat angle 70 may be about 19.6°. Valve angle 78 may be about 19.3°, and seat angle 70 and valve angle 78 may thus together define an interference angle 82. Interference angle 82 may be understood as an angle formed by starting face clearance 80 between outer seat face 66 and inner valve face 46 when the components are first placed in service, and gas exchange valve 24 is closed. It will also be understood that shortly after or even upon being placed into service, contact of valve head 26 with valve seat insert 38 can cause valve head 26 to deform such that full face contact between outer seat face 66 and inner valve face 46 occurs along full face width 74. Interference angle 82 may be about 0.35° when the components are first placed in service, and can eventually be expected to reduce to 0° as the components break-in.

INDUSTRIAL APPLICABILITY

Also shown in FIG. 2 is another profile 160 that might be observed in a known valve seat insert design. It can be noted that with a valve seat insert profile according to the known design relatively sharp corners between or adjacent to valve seat surfaces were provided. It could also be seen that an outer seat face in the known design would have a lesser full face width than that provided in the present design, as well as a larger interference angle with the valve head. In the known design, the relatively sharp corners would likely provide less resistance to valve recession due to a greater tendency to dig or cut into an inner valve face, whereas in the present design analogous contact can be cushioned. The larger interference angle of known design, which could be as much as 1°, would not enable a valve head to as readily deform or wear to a state of full face contact with the corresponding valve seat insert as does a valve seat insert and gas exchange valve according to the present disclosure. The relatively larger seat angle that might be formed in the known design is shown by way of reference numeral 170 in FIG. 2, and may be between about 3% and 4% larger than seat angle 70. Finally, it can be noted that the lesser full face width of the outer seat face in the known design, about 20% shorter, would have provided likely less surface area and contact length for distributing pressure. Differences between a known design and the present design may produce the surprising result of a reduction in contact pressure in some instances that is greater than 50% with other factors substantially the same.

Figure 3:
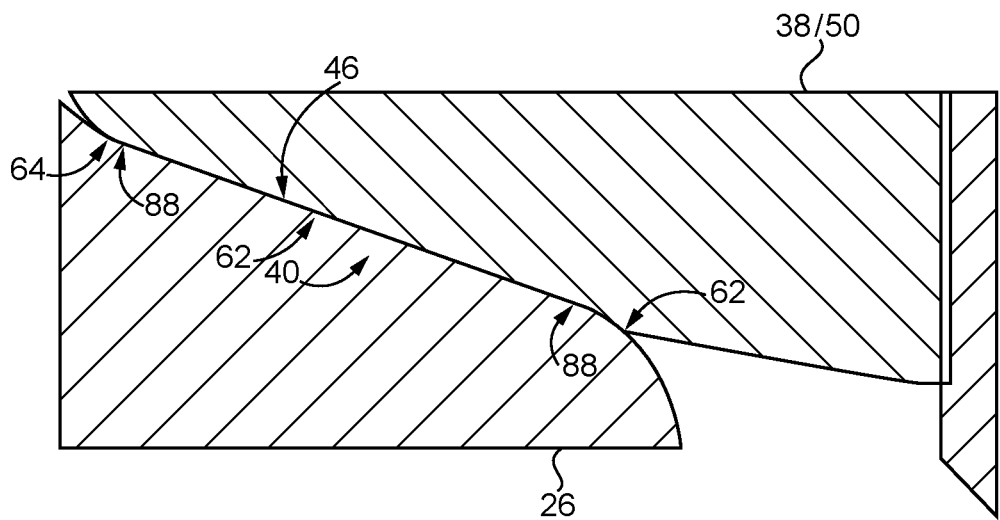
FIG. 3 is a sectioned side diagrammatic view of portions of a gas exchange valve and valve seat insert as they might appear at a wear state experienced after being placed in service in an internal combustion engine.

Referring now to FIG. 3, there is shown valve head 26 and valve seat insert 38 as they might appear at a later wear stage or state, in which it can be seen that valve head 26 has begun to recess into valve seat insert 38. At the state depicted in FIG. 3 contact band 88 extends substantially across an entirety of outer seat face 46 such that full face contact occurs, and with trailing radius 64 now beginning to contact valve head 26. From the state depicted in FIG. 3 further valve recession can be expected over time albeit at a slower rate than what might be observed in a known design.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure, Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having" or the like are intended to be open-ended terms. Further, the phrase "based on" is intended to mean "based, at least in part, on" unless explicitly stated otherwise.

What is claimed is:

1. An internal combustion engine comprising:
   an engine housing including a cylinder block having a cylinder formed therein, and an engine head coupled to the cylinder block and having a gas exchange conduit formed therein;
   a valve seat insert positioned at least partially within the engine head and having a compound valve seat extending circumferentially around a valve seat center axis;
   a gas exchange valve including a valve head having an outer valve face and an inner valve face, and the gas exchange valve being movable between a closed valve position where the inner valve face contacts the compound valve seat and the cylinder is blocked from fluid communication with the gas exchange conduit, and an open valve position;
   the compound valve seat having a valve recession-resistive profile formed by a leading radius contacted by the valve head at an early wear state of the valve head and valve seat insert, a trailing radius contacted by the valve head at a later wear state of the valve head and valve seat insert, and an outer seat face;
   the inner valve face defining a valve angle relative to a plane oriented normal to the valve seat center axis, and the outer seat face extending from the leading radius to the trailing radius and defining a seat angle relative to the plane; and
   the gas exchange valve is at the closed valve position, such that the inner valve face is in contact with the leading radius and the inner valve face overhangs the outer seat face; and
   the seat angle being larger than the valve angle, such that the leading radius forms a contact band with the inner valve face and a starting face clearance extends radially inward and axially inward from the contact band.

2. The internal combustion engine of claim 1 wherein the seat angle and the valve angle define an interference angle that is less than 1°.

3. The internal combustion engine of claim 2 wherein the interference angle is about 0.35°.

4. The internal combustion engine of claim 3 wherein the seat angle is about 19.6°, and the valve angle is about 19.3°.

5. The internal combustion engine of claim 2 wherein the outer seat face extends linearly between the leading radius and the trailing radius, and each of the leading radius and the trailing radius is blended with the outer seat face.

6. The internal combustion engine of claim 5 wherein the valve seat insert further includes:
   a chamfer located adjacent to the trailing radius, and the trailing radius is blended with the chamfer; and
   an end face located adjacent to the leading radius, and the leading radius is blended with the end face.

7. The internal combustion engine of claim 5 wherein a size of the leading radius is larger than a size of the trailing radius, and a size of the outer seat face is greater than a size of the leading radius and the size of the trailing radius.

8. The internal combustion engine of claim 7 wherein the size of the outer seat face is greater than a size of the chamfer and greater than a size of the end face.

9. The internal combustion engine of claim 8 wherein the size of the outer seat face includes a full face width greater than 3 millimeters.

10. A valve seat insert for a gas exchange valve in an internal combustion engine comprising:
    an insert body positionable within an engine head and including an outer surface, and an inner surface forming an opening within the insert body to fluidly connect a cylinder in the internal combustion engine to a gas exchange conduit in the engine head;
    a compound valve seat formed in the insert body and in communication with the opening, and the compound valve seat extending circumferentially around a valve seat center axis that extends between a leading axial body end and a trailing axial body end;
    the inner surface having a non-uniform inner profile that flares outward between the opening and the trailing axial body end, the outer surface having a non-uniform outer profile that dips inward between the leading axial body end and the trailing axial body end, and the compound valve seat having a valve recession-resistive profile;
    the valve recession-resistive profile being formed by a leading radius, an outer seat face, and a trailing radius structured, respectively, for contact with a valve head of a gas exchange valve at a contact band that advances radially inward and axially inward at successive wear stages of the valve seat insert and valve head;
    the outer seat face extending from the leading radius to the trailing radius, and the leading axial body end including an end face extending from the leading radius toward the outer surface and oriented diagonally to the valve seat center axis; and
    the outer seat face defining a seat angle relative to a plane oriented normal to the valve seat center axis that is between 19° and 20°, and having a full face width between the leading radius and the trailing radius that is between 3 millimeters and 4 millimeters.

11. The valve seat insert of claim 10 wherein the outer seat face extends linearly between the leading radius and the trailing radius, and each of the leading radius and the trailing radius is blended with the outer seat face.

12. The valve seat insert of claim 11 wherein a size of the leading radius is greater than a size of the trailing radius.

13. The valve seat insert of claim 12 wherein the size of the leading radius is about 2 millimeters, and the size of the trailing radius is about 1 millimeter.

14. The valve seat insert of claim 10 wherein the seat angle is about 19.6°, and the full face width of the outer seat face is about 3.6 millimeters.

15. The valve seat insert of claim 10 wherein the insert body further includes:
- a chamfer located adjacent to the trailing radius, and the trailing radius is blended with the chamfer; and
- an end face located adjacent to the leading radius, and the leading radius is blended with the end face.

16. An engine head assembly comprising:
- an engine head having a gas exchange conduit formed therein;
- a valve seat insert positioned at least partially within the engine head to fluidly connect the gas exchange conduit to an engine cylinder;
- the valve seat insert having an outer surface, a leading axial end, a trailing axial end, and having formed therein a compound valve seat extending circumferentially around a valve seat center axis and having a valve recession-resistive profile formed by a leading radius, an outer seat face, and a trailing radius structured, respectively, for contact with a valve head of a gas exchange valve at a contact band that advances radially inward and axially inward at successive wear stages of the valve seat insert and valve head; and
- the outer seat face extending from the leading radius to the trailing radius, and the leading axial body end including an end face extending from the leading radius toward the outer surface and oriented diagonally to the valve seat center axis; and defining a seat angle relative to a plane oriented normal to the valve seat center axis that is between 19° and 20° and having a full face width between the leading radius and the trailing radius that is between 3 millimeters and 4 millimeters.

17. The engine head assembly of claim 16 wherein:
the seat angle is about 19.6°;
the full face width of the outer seat face is about 3.6 millimeters;
a size of the leading radius is about 2 millimeters; and
a size of the trailing radius is about 1 millimeter.

18. The engine head assembly of claim 16 wherein the valve seat insert further includes:
- a chamfer located adjacent to the trailing radius, and the trailing radius is blended with the chamfer; and
- an end face located adjacent to the leading radius, and the leading radius is blended with the end face.

19. The engine head assembly of claim 18 wherein the outer seat face extends linearly between the leading radius and the trailing radius, and each of the leading radius and the trailing radius is blended with the outer seat face.

20. The engine head assembly of claim 16 wherein a coolant void is formed between the engine head and the valve seat insert.

* * * * *